United States Patent [19]

Saxton et al.

[11] Patent Number: 5,681,789

[45] Date of Patent: Oct. 28, 1997

[54] ACTIVATION OF AS-SYNTHESIZED TITANIUM-CONTAINING ZEOLITES

[75] Inventors: Robert J. Saxton, West Chester, Pa.; Guy L. Crocco, Senlis, France; John G. Zajacek, Devon, Pa.

[73] Assignee: Arco Chemical Technology, L.P., Greenville, Del.

[21] Appl. No.: 599,830

[22] Filed: Feb. 12, 1996

[51] Int. Cl.$^6$ .................................................. B01J 29/04
[52] U.S. Cl. ................................................. 502/85; 502/77
[58] Field of Search ................ 502/77, 85; 423/700–708

[56] References Cited

U.S. PATENT DOCUMENTS

| | | |
|---|---|---|
| 4,410,501 | 10/1983 | Taramasso et al. . |
| 4,610,854 | 9/1986 | Zones ........................ 423/326 |
| 4,683,214 | 7/1987 | Angerine et al. . |
| 4,833,260 | 5/1989 | Neri et al. . |
| 4,851,200 | 7/1989 | Ryan . |
| 4,916,097 | 4/1990 | Chu et al. . |
| 5,321,102 | 6/1994 | Loy et al. . |
| 5,365,009 | 11/1994 | Uppal et al. . |
| 5,425,934 | 6/1995 | Malla et al. . |
| 5,462,905 | 10/1995 | Nagami et al. ............. 502/232 |

OTHER PUBLICATIONS

Chem. Abstract 106–158284n "Liquid–phase regeneration of olefin hydration zeolite catalysts" 1987 (no month).

"Synthesis of All–Silica Zeolite β", van der Waal et al., *J. Chem. Soc. Chem. Commun.*, 1994, pp. 1241–1242.

"Ozone Reactivation of a A Synthetic zeolite dcatalyst for Methanol Conversion", Copperthunite et al., *J. Chem. Soc. Chem. Commun.* pp. 644–645 1985.

Hutchings et al., "A Comparative Study of Reactivation...", *Applied catalysts* 34 (1987), 153–161.

Primary Examiner—Michael Lewis
Assistant Examiner—Thomas G. Dunn, Jr.
Attorney, Agent, or Firm—Stephen D. Harper

[57] ABSTRACT

An as-synthesized zeolite having titanium substituted in its lattice framework and containing an organic template such as a quaternary ammonium salt may be activated for use as a catalyst by treating said as-synthesized zeolite with ozone. At least partial removal and/or reaction of the organic template is accomplished even at moderate temperatures, in contrast to conventional calcination techniques which require the use of significantly higher activation temperatures.

12 Claims, No Drawings

ACTIVATION OF AS-SYNTHESIZED TITANIUM-CONTAINING ZEOLITES

FIELD OF THE INVENTION

This application relates to a method of activating a titanium-containing zeolite for use as a catalyst. In particular, the application pertains to the treatment of a zeolite such as titanium silicalite containing an organic template with ozone whereby high temperature calcination is avoided.

BACKGROUND OF THE INVENTION

In recent years, zeolites containing titanium atoms in their framework structures have been found to be remarkably active and selective catalysts for the oxidation of hydrocarbons. For example, TS-1 titanium silicalite catalyzes the reaction of hydrogen peroxide with propylene to form propylene oxide in high yield (Neri et al., U.S. Pat. No. 4,833,260). Such materials are conventionally prepared by reacting a silica source such as tetraalkyorthosilicate and a titania source such as titanium tetralkoxide in the presence of an organic template such as a tetraalkylammonium hydroxide. The reactant mixture is subjected to hydrothermal treatment in an autoclave at an elevated temperature until crystals of as-synthesized TS-1 titanium silicalite are formed. Such crystals are separated from the liquid components of the reactant mixture, washed with water and then dried. The as-synthesized titanium silicalite thus obtained contains organic template, presumably occluded within the pores of the titanium-containing zeolite but not covalently bonded to the inorganic elements of the zeolite framework. Where the template comprises a cationic species such as a quaternary ammonium cation, it is believed that the template may be held within the zeolite by ionic interactions. The synthetic titanium-containing zeolites prepared in the presence of organic templates are initially inactive as catalysts. It is believed that this catalytic inactivity can be attributed to the presence of organic template molecules in the intracrystalline free space of the zeolite. In order to remove the organic template and activate the zeolite for use as an oxidation catalyst, it has heretofore been thought to be necessary to heat the as-synthesized crystals for between 1 and 72 hours in air at 550° C. (see the teachings of U.S. Pat. Nos. 4,410,501 and 4,833,260). Although TS-1 titanium silicalite is apparently sufficiently robust to withstand high temperature calcination, it is well known that crystal structure degradation and certain other deleterious changes can occur when less stable zeolites are subjected to such extreme conditions. The discovery of alternative low temperature methods of activating as-synthesized titanium-containing zeolites thus would be highly desirable.

The treatment of an all-silica zeolite beta containing dibenzyldimethylammonium cation with 1% ozone in oxygen at 110° C. followed by a hot acetone wash was recently reported to completely remove the template with full retention of crystallinity [van der Waal et al., *J. Chem. Soc., Chem. Commun.* 1241–1242 (1994)]. The catalytic properties of the ozonized zeolite were not reported, however, and application of the ozone treatment to a titanium-containing zeolite was not suggested.

Calcination of an as-synthesized zeolite at elevated temperatures also is commonly practiced to "heal" any silanol (SiOH) groups present in the zeolite as a result of defect sites or vacancies in the lattice framework. Workers in the field have believed that removal or neutralization of the silanol groups in a titanium-containing zeolite through calcination or treatment with a basic substance is necessary in order to obtain an activated zeolite having high selectivity as a catalyst in an olefin epoxidation process. For example, U.S. Pat. No. 4,824,976 and Notari, *Studies in Surface Catalysis*, 243–256 (1991) teach the desirability of treating a calcined TS-1 titanium silicalite with an acid neutralizing agent in order to further reduce the number of SiOH groups present. Low temperature treatment of an as-synthesized titanium-containing zeolite with a reagent such as ozone thus would not have been expected to significantly change the concentration of silanol groups in the zeolite nor provide a highly active and selective epoxidation catalyst.

SUMMARY OF THE INVENTION

This invention provides a method of activating for use as a catalyst an as-synthesized zeolite containing framework titanium atoms and an organic template comprising contacting said as-synthesized zeolite with ozone for a time and at a temperature sufficient to reduce the amount of organic template contained therein. Said activation method is surprisingly effective; ozonized zeolites which still contain substantial amounts of organic template and/or residues derived from the organic template are capable of catalyzing olefin epoxidation at reaction rates and selectivities comparable to calcined titanium-containing zeolites. It is thought that the ozone at least partially oxidizes the organic template to form oxidation products which are thereafter removable from the zeolite by desorption or other means, yielding an activated zeolite. The effectiveness of the activation method described herein is surprising in view of the small pore size of certain zeolites such as TS-1 titanium silicalite.

DETAILED DESCRIPTION OF THE INVENTION

The as-synthesized zeolites which may be activated using the process of this invention comprise the class of porous zeolitic substances wherein titanium atoms are substituted for a portion of the silicon atoms in the lattice framework of a molecular sieve and an organic template is trapped or occluded within the molecular sieve such that it cannot readily be removed by washing, low temperature heating, or the like. When the template is a salt, it is believed that the cationic portion of the template possibly is held within the sieve by ionic interactions with anionic sites in the framework of the zeolite.

For the purposes of this invention, suitable molecular sieves include the class of porous crystalline titanosilicates that contain at least titanium, silicon, and oxygen atoms in their framework lattices. Such substances are well-known in the art and are described, for example, in U.S. Pat. No. 4,410,501 (Taramasso et al.), U.S. Pat. No. 4,824,976 (Clerici et al.), U.S. Pat. No. 4,666,692 (Taramasso et al.), Thangaraj et al., *J. Catal.* 130, 1 (1991), Reddy et al., *Applied Catal.* 58, L-1 (1990), Reddy et al., *J. Catal.* 130, 440 (1991), Reddy et al., *Zeolites* 12, 95 (1992), Belgian Pat. Pub. No. 1,001,038 (Bellussi et al.), Huybrechts et al., *J. Mol. Catal.* 71,129 (1992), Huybrechts et al., *Catal. Letter* 8, 237 (1991), U.S. Pat. No. 4,656,016 (Taramasso et al.), U.S. Pat. No. 4,859,785 (Bellussi et al.), European Pat. Pub. No. 269,018 (Bellussi et al.), U.S. Pat. No. 4,701,428 (Bellussi et al.), U.S. Pat. No. 4,937,216 (Clerici et al.), European Pat. Pub. No. 311,983 (Padovan et al.), European Pat. Publ. No. 132,550 (Saleh), U.S. Pat. No. 5,082,641 (Popa et al.), Clerici et al., *J. Catal.* 129, 159 (1991), Bellussi et al., *J. Catal.* 133, 220 (1992), Szostak, *Molecular Sieves-Principles of Synthesis and Identification*, pp.

250–252 (1989), Notaft, "Synthesis and Catalytic Properties of Titanium containing Zeolites", *Innovation in Zeolite Materials Science.*, Grobet et al., Eds., 413 (1988), U.S. Pat. No. 5,262,550 (Crocco et al.), Tuel et al., *Applied Catalysis A:General* 110, 137–151 (1994), Sulikowski et al., *J. Chem. Soc., Chem. Commun.* 123–124 (1992), European Pat. Pub. No. 638,362 (Onozawa et al.), Japanese Kokai No. 4-59769 (Kawai et al.), U.S. Pat. No. 5,354,875 (Nemeth et al.), German Pat. No. 4,419,195 (Thiele et al.), WO 94/12277 (Schodel et al.), European Pat. Pub. No. 665,188 (Tuel et al.), Japanese Kokai No. 6-211821 (Takahashi et al.), European Pat. Pub. No. 631,983 (Muller et al.), U.S. Pat. No. 5,246,688 (Faust et al.), Canadian Pat. No. 1,185,224 (Baltes et al.), U.S. Pat. No. 5,401,486 (Mueller et al.), U.S. Pat. No. 5,474,754 (Saxton et al.), U.S. Pat. No. 5,453,511 (Saxton), and U.S. Pat. No. 5,412,122 (Saxton et al.). The teachings of these publications are incorporated herein by reference in their entirety.

Generally speaking, as-synthesized zeolites capable of being activated by the method of the present invention may be readily obtained by hydrothermal synthesis techniques wherein sources of silica ($SiO_2$) and titania ($TiO_2$) are reacted at a moderately elevated temperature over a several day period in the presence of a quaternary ammonium species which functions as an organic template. Particularly preferred as-synthesized zeolites include the classes of as-synthesized zeolites comprising molecular sieves commonly referred to as "TS-1" (having an MFI topology analogous to that of the ZSM-5 aluminosilicate zeolites), "TS-2" (having an MEL topology analogous to that of the ZSM-11 aluminosilicate zeolites), "TS-3" (as described in Belgian Pat. No. 1,001,038), "TS-48" (having a ZSM-48 structure), and "TS-12" (having an MTW-type structure). As-synthesized titanium-containing molecular sieves having a zeolite beta structure are also suitable for use as well as those materials designated "CIT-1", "SSZ-33", "ETS-4", "ETS-10", and "Ti-MCM-41". The zeolite preferably contains no non-oxygen elements other than titanium and silica in its lattice framework, although minor amounts of aluminum, iron, germanium, and the like can be present. In one embodiment, essentially all of the titanium present is in the zeolite-like lattice framework. In another embodiment, extra-framework titanium is additionally present.

As-synthesized zeolites suitable for use in the process of this invention may desirably have an inorganic composition corresponding to the following empirical formula $xTiO_2 \cdot (1-x)SiO_2$, where x is between 0.0001 and 0.500. More preferably, the value of x is from 0.01 to 0.125. As explained earlier, the as-synthesized zeolites additionally contain organic template; the foregoing formula thus does not reflect the elements comprising such template. The molar ratio of Si:Ti in the lattice framework of the as-synthesized zeolite is advantageously from 9.5:1 to 99:1 (most preferably, from 9.5:1 to 60:1). As-synthesized zeolites which are relatively high in titanium content may be utilized wherein x is between 0.045 and 0.125.

The organic template may be any organic species capable of acting as a template or structure directing agent during preparation of the as-synthesized zeolite (i.e., an agent capable of assisting the arrangement of the silica and titania into the lattice framework of the zeolite). As is well-known in the art, the crystal form of the inorganic portion of the as-synthesized zeolite may be varied as desired by selecting different organic templates for use during the preparation of said zeolite. The pore size, channel structure, and topology of such catalyst and arrangement of atoms in the zeolite framework are influenced by the size and shape of the organic template. Typically, the organic template is a quaternary ammonium salt although other species such as tertiary and primary amines, phosphonium salts and the like may also be employed. Suitable quaternary ammonium salts may, for example, be selected from salts wherein the cation is tetra n-propyl ammonium, tetra n-butyl ammonium, tetraethyl ammonium, tetramethyl ammonium, methyl tri-n-butyl ammonium, triethyl methyl ammonium, n-hexyl trimethyl ammonium, trimethyl ammonium, benzyl triethyl ammonium, n-dodecyl trimethyl ammonium, benzyl tri-n-propyl ammonium, tetra n-pentyl ammonium, ethyl pyridinium, diethyl piperidinium, tetra-n-hexyl ammonium, tetra-n-octyl ammonium, tetra-n-dodecyl ammonium, trimethyl ethanol ammonium, hexamethylene bis (diethyl methylammonium), hexamethonium, and the like and combinations thereof and well as any other quaternary ammonium salts known in the art to be useful in the preparation of titanium-containing synthetic zeolites or molecular sieves. Di-, tri-, as well as polyquaternary ammonium salts may also be utilized as the organic template. The four organic groups substituted on nitrogen may be the same or different. The nitrogen substituents may have cyclic structures such that the nitrogen is contained within a ring. The anion portion of the quaternary ammonium salt may be any suitable species, but typically is hydroxide, halide, or the like. Once the organic template is incorporated into the as-synthesized zeolite, the anion may be some negatively charged species within or associated with the framework of the zeolite. The organic template may preferably correspond to the following structure $[R^1R^2R^3R^4N]X$ wherein $R^1$, $R^2$, $R^3$, and $R^4$ are the same or different and are selected from $C_1$–$C_{12}$ alkyl groups and X is hydroxide, halide, or the aforementioned framework anionic site.

The as-synthesized zeolite may be in powder, pellet, microspheric, extruded, monolithic or any other suitable physical form when subjected to the activation procedure described herein. Alternatively, the physical form of the zeolite may be altered as desired following ozone treatment. The use of a binder (co-gel) or support in combination with the untreated or treated zeolite may be advantageous. Supported or bound materials may be prepared by the methods known in the art to be effective for zeolite catalysts in general.

Illustrative binders and supports include silica, alumina, titania, silica-alumina, silica-titania, silica-thoria, silica-magnesia, silica-zironia, silica-beryllia, and ternary compositions of silica with other refractory oxides. Also useful are clays such as montmorillonites, koalins, bentonites, halloysites, dickites, nacrites, and anaxites. The proportion of zeolite:binder or support may range from 99:1 to 1:99, but preferably is from 5:95 to 80:20. The methods described in U.S. Pat. No. 4,701,428 (incorporated herein by reference in its entirety) may be adapted for the preparation of microspheres containing oligomeric silica binder and as-synthesized zeolite which are suitable for use in the process of this invention.

Similarly, the synthetic methods described in U.S. Pat. Nos. 5,354,875 and 5,466,835 and WO 94/12277 (incorporated herein by reference in their entirety) for the preparation of titanium-containing zeolites supported on or admixed with titania and the like may be employed to obtain as-synthesized zeolite-containing materials suitable for activation using the present invention.

The as-synthesized zeolite is contacted with ozone for a time and at a temperature effective to remove at least a portion of the organic template. Without wishing to be bound by theory, it is believed that the ozone reacts with the organic template so as to convert it at least partially into volatile or soluble oxidation products which may be more readily removed from the as-synthesized zeolite than the organic template itself. For instance, treating an as-synthesized zeolite containing a quaternary ammonium salt template with ozone may form oxidized hydrocarbons and/or nitrogen-containing compounds of relatively small size which are capable of being removed from the zeolite by desorption (e.g., by heating and/or reduction of pressure) or washing with a suitable solvent. Remarkably, however, it is not necessary to completely react or remove the organic template in order to attain catalytic performance comparable to that of an as-synthesized zeolite which has been calcined by conventional methods to quantitatively eliminate the organic template. Removal of the organic template may be monitored by measurement of the percent carbon (% C) present using standard elemental analysis methods, since the organic template is typically the only carbon-containing component present in the as-synthesized zeolite. Thermogravimetric analysis (TGA) methods may also be employed. It will generally be desirable to expose the as-synthesized zeolite to ozone under conditions sufficient to reduce the carbon level present by at least 25%, more preferably, at least 50%. Temperatures of from 25° C. to 300° C. (more preferably, 100° C. to 250° C.) and ozone contact times of from 1 to 72 hours are typically utilized. Although pure ozone could, in theory, be used, for practical reasons it is preferred that the as-synthesized zeolite be exposed to a gaseous stream comprised of 0.1 to 20 volume percent ozone. To achieve relatively rapid activation, it is desirable to maintain an ozone concentration in the gaseous stream of at least 1%. The balance of the gaseous stream may be any suitable gas such as oxygen, nitrogen, air, or the like or mixtures thereof. Methods of generating ozone are well-known, including, for example, UV irradiation of air or oxygen as well as corona discharge techniques. Ozone generators are available commercially. The pressure during ozone treatment is not critical. The use of oxygen or oxygen-enriched air as feed to an ozone generator is preferred in order to attain ozone concentrations of 1% or greater in the feed exiting the generator. While it is generally most convenient to operate the activation process at approximately atmospheric pressure, subatmospheric or superatmospheric pressures could also be utilized.

The as-synthesized zeolite is preferably separated in solid form from any liquid components of the hydrothermal crystallization mixture which are present prior to treatment with ozone in accordance with the present invention. For example, the as-synthesized zeolite may be readily collected by filtration, centrifugation, decantation, or other such mechanical means and then transferred into a vessel which is suitable for carrying out the activation. Washing of the as-synthesized zeolite with a suitable solvent such as water or the like may be performed prior to ozone treatment. Additionally, the as-synthesized zeolite, which is typically obtained as a fine powder from hydrothermal crystallization, may be shaped into a different form (e.g., pellets, extrudates, or the like) before contacting with ozone. It is not normally necessary to completely dry the recovered as-synthesized zeolite prior to activation since any minor amounts of solvent and the like adsorbed on the as-synthesized zeolite can be readily removed and disposed of during the activation procedure of this invention. Of course, a preliminary drying of the as-synthesized zeolite at relatively low temperatures (e.g., 20° C. to 125° C.) and/or subatmospheric pressure could also be carried out if desired.

The as-synthesized zeolite may be placed in any vessel constructed of materials resistant to ozone and capable of retaining the zeolite. For example, the as-synthesized zeolite may be packed as a fixed bed into a heated tubular reactor wherein a gaseous stream containing ozone is introduced into one end, permitted to flow over the zeolite bed, and withdrawn from the other end of the reactor. The temperature within the vessel may be kept constant during activation or may be periodically or continuously increased or decreased as may be desired. The activation process may be conducted such that the gaseous stream is continually passed over the as-synthesized zeolite in order to sweep away any volatile products evolved. Alternatively, the activation may be performed in a discontinuous or static manner. That is, a volume of gas may be introduced into the vessel containing the as-synthesized zeolite and the vessel sealed and heated for some period of time before discharging the gas and replacing it with a fresh volume of ozone-containing gas.

In an alternative embodiment of the invention, the ozonolysis is performed in a liquid medium such as water or an organic solvent (preferably, one that is inert towards ozone under the treatment conditions employed). For example, the titanium-containing zeolite may be suspended in the liquid medium and ozone introduced into or generated within the liquid medium using an appropriate means. The oxidation products formed from the organic template may be removed from the zeolite by the solvating action of the liquid medium.

Following ozone treatment, the activated zeolite may be further treated if so desired to further modify its catalytic properties. In some instances, it may be desirable to wash the activated zeolite with an organic solvent such as isopropanol prior to use as an oxidation catalyst. Such washing, however, is not necessary in order to attain a zeolite exhibiting satisfactory catalytic performance. The activated zeolite may be heated, swept with a stream of gas which is free of ozone such as nitrogen or air or the like and/or subjected to vacuum (i.e., subatmospheric pressure) in order to promote further desorption of any volatile organic template reaction products which may still be present. While not necessary, the activated zeolite may also be treated with a basic substance (e.g., washed with an aqueous solution of a weak or strong base such as sodium acetate) or a silylating agent (e.g., trimethyl chlorosilane). Subsequent to treatment with ozone, the activated zeolite may also be shaped into a different physical form if so desired.

The activated zeolites obtained by practice of the present invention are generally useful for the same catalytic purposes as titanium-containing zeolites such as titanium silicalite produced by conventional activation means (e.g., calcination). For example, the activated zeolite is suitable for use in a process for epoxidation of an olefin comprising contacting said olefin with hydrogen peroxide or an organic hydroperoxide in the presence of a catalytically effective amount of the activated zeolite at a temperature of from 20° C. to 120° C. Epoxidation process of this type are well-known and are described for example, in U.S. Pat. Nos. 4,833,260, 5,214,168, 5,262,550, 5,374,747, 5,384,418 and 5,412,122 (the teachings of all these patents are incorporated herein by reference in their entirety).

EXAMPLES

General Ozonolysis Procedure

A fritted quartz tube is charged with about 3 g of as-synthesized zeolite and fitted vertically inside a furnace. The zeolite is first dried overnight at 120° C. using a slow nitrogen flow. The nitrogen flow is then discontinued and an air flow begun at about 0.5 L/min. The ozone generator is switched on (0.7 amps) and ozone introduced to the quartz tube at an estimated concentration of 0.1 to 0.5%. The furnace is then heated to the desired temperature (typically, 180° C.). After the desired ozonolysis time, the ozone flow is discontinued, the furnace cooled and the activated zeolite removed from the quartz tube. The zeolite is slurried with hot acetone for two hours, filtered and dried at 120° C. overnight.

Example 1

An as-synthesized TS-1 titanium silicalite containing a relatively low level of titanium was prepared by reacting tetraethyl orthosilicate, titanium (IV) ethoxide, and tetrapropylammonium hydroxide (organic template) in accordance with the procedures described in U.S. Pat. No. 4,410,501. A portion of the as-synthesized zeolite was calcined in air at 520° C. for 5 hours to provide TS-1 titanium silicalite having an MFI crystalline phase and containing 0.94 weight percent titanium and essentially no organic template.

Another portion of the as-synthesized material was treated with ozone at 180° C. for 32 hours as described in the general procedure above. The resulting TS-1 titanium silicalite containing 3.8 wt. % C, 0.63 wt. % N, 0.36 wt % H, and 0.91 wt. % Ti.

Example 1-A

The performance of the ozonized TS-1 titanium silicalite as an olefin epoxidation catalyst was evaluated using the following procedure. An oxidant mixture was prepared by mixing 150 g isopropanol, 30 g water, 20 g of 50 wt % aqueous hydrogen peroxide, 0.60 g acetic acid, and 0.20 g formic acid. The oxidant mixture contained 5.30 wt % hydrogen peroxide by iodometric titration. A Parr reactor was charged with 40.0g oxidant mixture (0.062 mol $H_2O_2$), 0.60g TS-1 titanium silicalite activated by ozone in accordance with Example 1, 0.0075 g diammonium hydrogen phosphate, and a stir bar. After flushing the reactor with an inert gas and sealing, 16.8 mL (0.21 mol) propylene was added using a sight glass and dip tube and the reactor submerged in an oil bath. The reaction mixture was stirred for 40 min at 56° C. The reactor was thereafter submerged in an ice bath and vented into a gas bag after cooling to an internal temperature of 20° C. The vapor in the gas bag was analyzed by TCD for oxygen and by gas chromatography for organic products. The liquid remaining in the reactor was analyzed by gas chromatography and iodometric titration (0.27 wt % $H_2O_2$). Hydrogen peroxide conversion was 95%. Selectivity based on $H_2O_2$ was 90% to propylene oxide, 5% to acetone, 5% to glycols, and <1% to oxygen.

Comparative Example 1-B

The epoxidation procedure described above was repeated using 0.40 g of the TS-1 titanium silicalite which had been calcined as described above. Hydrogen peroxide conversion was 97%. Selectivity based on $H_2O_2$ was 88% to propylene oxide, 6% to acetone, 6% to glycols, and <1% to oxygen.

Example 2

An as-synthesized TS-1 titanium silicalite containing a relatively high level of titanium and tetrapropylammonium hydroxide as the organic template was prepared in accordance with the procedures described in Thangaraj et al., *J. Catal.* 130, 1-8 (1991), Thangaraj et al., *Zeolites* 12, 943–950 (1992), and Mirajkar et al., *J. Phys. Chem.* 96, 3073–3079 (1992). One portion of the dried as-synthesized zeolite was treated with ozone at 180° for 16 hours as previously described to yield crystalline TS-1 titanium silicalite containing 3.3 wt. % C, 0.60 wt. % N, 0.44 wt. % H, and 6.0 wt. % Ti. Another portion was calcined in air at 520° C. for 5 hours.

Example 2-A

The epoxidation procedure of Example 1 was repeated using 0.60 g of the ozonized, high titanium TS-1 titanium silicalite. Hydrogen peroxide conversion was 97%; selectivity based on $H_2O_2$ was 89% to propylene oxide, 5% to acetone, 6% to glycols, and <1% to oxygen.

Example 2-B

The epoxidation procedure of Example 1 was repeated using 0.40 g of the ozonized, high titanium TS-1 titanium silicalite and 0.0037 g of sodium chloride instead of diammonium hydrogen phosphate. Hydrogen peroxide conversion was 86%. Selectivity based on $H_2O_2$ was 86% to propylene oxide, 5% to acetone, 9% to glycols, and <1% to oxygen.

Example 2-C

This example illustrates the use of the ozonized high titanium TS-1 titanium silicalite in an olefin epoxidation process wherein methanol is used as a solvent. An oxidant mixture containing 5.10 wt. % $H_2O_2$ by iodometric titration was prepared by mixing 80 g methanol, 10 g water, 10 g 50% aqueous hydrogen peroxide, 0.20 g acetic acid, and 0.05 g formic acid. A Parr reactor was charged with 40.0 g of the oxidant mixture (0.060 mol $H_2O_2$), 0.38 g ozonized, high titanium TS-1 titanium silicalite, 0.0075 g diammonium hydrogen phosphate, and a stir bar. The epoxidation was performed in accordance with the procedure of Example 1-A. Hydrogen peroxide conversion was 99%. Selectivity based on $H_2O_2$ was 93% to propylene oxide, 7% to glycols, and <1% to oxygen.

Comparative Example 2-D

The epoxidation procedure of Example 1-A was repeated using 0.40 g of the calcined, high titanium TS-1 titanium silicalite. Hydrogen peroxide conversion was 94%. Selectivity based on $H_2O_2$ was 88% to propylene oxide, 4% to acetone, 7% to glycols, and <1% to oxygen.

Example 3

An as-synthesized aluminum-free titanium beta zeolite containing 4,4'-trimethylene bis (N-benzyl N-methyl piperidinium) dihydroxide as an organic template (28 weight % organic content as determined by TGA weight loss) was prepared following the procedures described in U.S. Pat. No. 5,453,511. One portion of the dried as-synthesized zeolite was treated with ozone at 200° C. for 2 days as previously described to yield crystalline aluminum-free titanium beta containing 7 weight percent organic residue (as determined by TGA weight loss). A second portion of the dried as-synthesized zeolite was calcined. The two portions of zeolite exhibited comparable performance as catalysts in the epoxidation of 1-hexene using hydrogen peroxide (12 g methanol, 15 mmol 1-hexene, 4.5 mmol $H_2O_2$, 0.2 g catalyst, 60° C., 2 hr): 50% $H_2O_2$ conversion, 35% selectivity (based on $H_2O_2$) to epoxide, 30% selectivity to glycol ethers.

The foregoing examples demonstrate that an as-synthesized titanium-containing zeolite which has been treated with ozone in accordance with the present invention is capable of catalyzing olefin epoxidation to achieve hydrogen peroxide conversions and epoxide selectivities comparable to those obtained using conventional calcined zeolites. This result was surprising in view of the fact that the ozonized catalysts still contained substantial amounts of quaternary ammonium salt and/or organic residues derived from the template.

We claim:

1. A method of activating for use as a selective olefin epoxidation catalyst an as-synthesized zeolite containing framework titanium atoms and an organic template comprising contacting said as-synthesized zeolite with a gaseous stream comprising 0.1 to 20 volume percent ozone at a temperature of from 25° C. to 300° C. for a time effective to remove at least a portion of the organic template.

2. The method of claim 1 wherein the as-synthesized zeolite has an MFI, MEL, or zeolite beta crystalline framework structure.

3. The method of claim 1 wherein the organic template is a quaternary ammonium salt.

4. The method of claim 1 wherein the gaseous stream is passed over the as-synthesized zeolite.

5. The method of claim 1 wherein following said contacting step the as-synthesized zeolite is washed with an organic solvent.

6. A method of activating for use as a selective olefin epoxidation catalyst an as-synthesized zeolite containing framework titanium atoms and a quaternary ammonium salt and having a MFI, MEL or zeolite beta crystalline framework structure comprising contacting said as-synthesized zeolite with a flowing gaseous stream comprising 0.1 to 20 volume percent ozone at a temperature of 100° C. to 250° C. for a period of from 1 to 72 hours.

7. The method of claim 6 wherein said quaternary ammonium salt is tetrapropylammonium hydroxide.

8. The method of claim 6 wherein the as-synthesized zeolite is obtained by hydrothermal crystallization of a reaction mixture comprising a titanium tetraalkoxide, a tetraalkylortho-silicate, and the quaternary ammonium salt.

9. The method of claim 6 wherein following said contacting step the as-synthesized zeolite is washed with an organic solvent.

10. The method of claim 6 wherein the carbon content of the as-synthesized zeolite has been reduced by at least 50% as compared to the carbon content prior to said contacting with ozone.

11. The method of claim 6 wherein the as-synthesized zeolite is titanium silicalite.

12. The method of claim 6 wherein the as-synthesized zeolite is formed into an extrudate prior to contacting with the flowing gaseous stream.

* * * * *